Sept. 16, 1969    J. L. GRATZMULLER    3,467,129
HYDRAULICALLY-OPERATED VALVE
Filed March 29, 1966    2 Sheets-Sheet 1
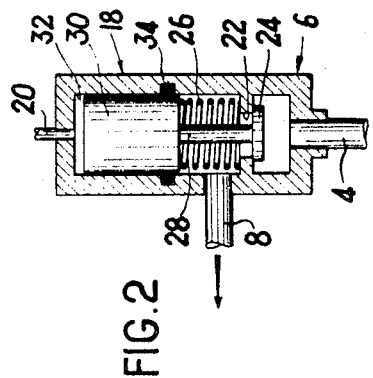
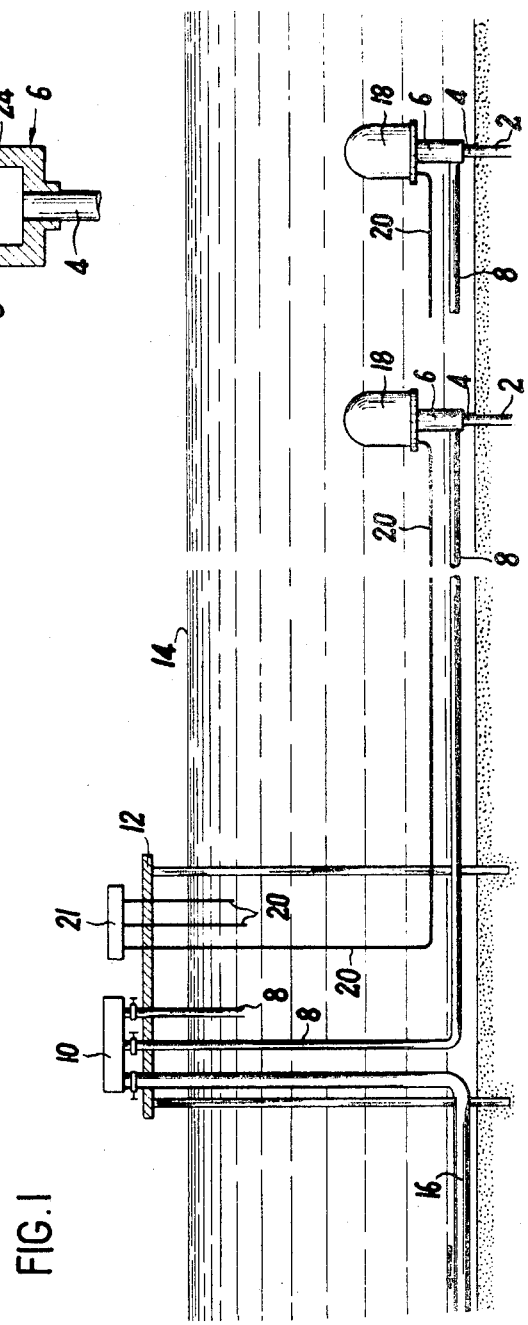

Sept. 16, 1969  J. L. GRATZMULLER  3,467,129
HYDRAULICALLY-OPERATED VALVE
Filed March 29, 1966  2 Sheets-Sheet 2

United States Patent Office 3,467,129
Patented Sept. 16, 1969

3,467,129
HYDRAULICALLY-OPERATED VALVE
Jean Louis Gratzmuller, 66 Boulevard Maurice Barres,
Neuilly, Hauts-de-Seine, France
Filed Mar. 29, 1966, Ser. No. 538,359
Claims priority, application France, Mar. 31, 1965,
11,325
Int. Cl. F16k *31/143*
U.S. Cl. 137—236         3 Claims

ABSTRACT OF THE DISCLOSURE

An underwater well-head control system in which a well-head is attached to the end of each drilling and a hydraulically controlled valve is interposed between the well-head and a petroleum outlet pipe leading to the storage tanks. The valve includes a valve closing device, resilient means tending to maintain the device in the closed position and a hydraulic jack tending to open such device with the jack being adapted for connection to a hydraulic fluid source. A central control point located above sea level and having the source of pressurized fluid and a low pressure tank is connected to the jack via a control pipe and selective means permits the selective linking of a control pipe with the source and the low pressure tank.

---

This invention relates to an hydraulically-operated valve and a centrally-controlled plant allowing the remote control of a number of such valves situated in inaccessible positions under the normal circumstances of exploitation.

The general term "valve" will be used hereinafter and in the claims to indicate any device controlling the flow of fluid in a pipe notably any apparatus which in one position allows the flow of the fluid and in another position prevents said flow. Naturally, the same term valve applies equally to hydraulic or pneumatic switching apparatus, whose function is to direct the flow of the fluid in one direction, or another.

A particularly interesting application of the invention is found in circumstances where the valves have to be installed in an environment where an operator cannot normally reach them because of, for example, pressure, atmosphere, radiation, electric current or the like, which subsist in the environment and where, in spite of this inaccessibility, great reliability of functioning of the valves is needed, the control operations being given from a distance from a control-post presenting normal conditions of access.

The invention relates especially to valves intended to control the flow of petroleum issuing from submarine drillings. For exploitation of submarine drillings, one often has to control a number of valves situated at a great depth, and each of which is interposed between a well-head linked to the end of each drilling and with a petroleum outlet pipe communicating with storage tanks situated above sea level.

According to the present invention there is provided an hydraulically-operated valve including a valve closing device, resilient means which tends to maintain said device in the closed position, a hydraulic jack which tends to open the closing device, said jack being adapted for connection to a source of hydraulic fluid.

The present invention is also an installation for the exploitation of a submarine oil field comprising at least one drilling, a well-head attached to the end of each drilling, and situated below sea level, a hydraulically-controlled valve (as defined in the preceding paragraph) interposed between said well-head and a petroleum outlet pipe leading to storage tanks, a central control point situated above sea level and including a source of pressurized hydraulic fluid and a low-pressure tank, a control-pipe connecting said jack with the said source and tank, and selective means of communication permitting the selective linking of the control pipe with the source and low pressure tank.

According to this arrangement, total security of functioning of the valve is assured, since the closing-device can under all circumstances return to the safety position, i.e., the closed position, under the influence of the resilient means which are always available.

When the distance between the control post and the valves is important and when the above-mentioned control-pipe is of narrow section, it is of advantage to insert in the pipe, in the immediate vicinity of the jack, an automatic clack-valve called "rapid-draining," which valve, when the control-pipe is decompressed (i.e., when, at the central post, the abovementioned means of switching are put into the draining position), opens a direct draining orifice to the exterior, thus avoiding the necessity for the hydraulic fluid, driven back by the piston of the jack by the returning effect of the resilient means, to make use of the long and narrow control-pipe.

In this way a very rapid closure of the valve is effected, a fact which increases the security of its functioning.

As the valves are inaccessible, means is preferably provided to indicate whether the valves are in the open or closed position, with this means also serving to offer complete security of function.

Preferably, a device sensitive to the pressure of the controlling hydraulic fluid is attached to the control-post.on the control-pipe linking this post to the jack and down stream from the selective means of communication. When this device indicates that the pipe has been subjected to the raised pressure of the controlling hydraulic fluid, this means that the valve is open.

In a valve according to the invention, which is required to remain for long period without without the possibility of inspection at a great depth in the sea, particular steps are taken to avoid corrosion by sea water and by crude petroleum. These steps which will be described hereinafter in more detail consist principally in enclosing all the control-units of the valve, and if necessary the valve itself, in a bell which is full of oil and into which sea water cannot penetrate, means being provided to allow any variation inside the bell in the course of the movements of the jack, without allowing the entry of sea water.

An embodiment of the present invention will now be described by way of example with reference to the accompanying drawings in which:

FIG. 1 is a diagrammatic illustration of a petroleum plant according to the invention;

FIG. 2 is a sectional view of one of the valves shown in FIG. 1;

Figure 3:
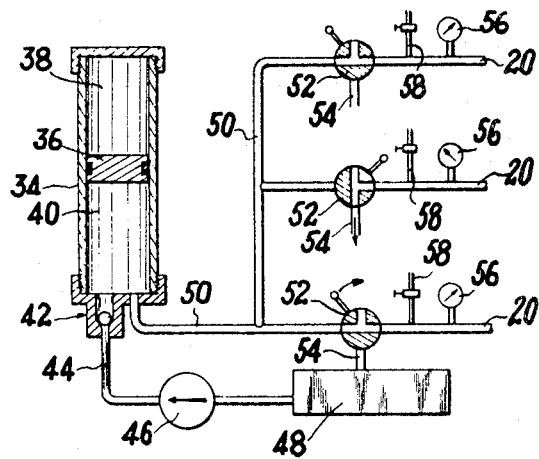
FIG. 3 is a diagrammatic illustration of the means of control at the central post.

Referring to the drawings, two submarine drillings 2, having well-heads 4 are located on the sea bed and each is linked to a valve 6 which allows or prevents the flow of the petroleum from the drilling 2 to an outlet-pipe 8 which is linked for example by means of a distributor 10 mounted on a platform 12 above sea level 14, to a general collector 16 which ends at storage tanks (not shown) on land.

Each valve 6 is controlled by an hydraulic jack 18 and each jack is fed by an individual control-pipe 20 from a central control post 21, situated on the platform 12. The control-pipes 20 will be described in more detail with relation to FIG. 3.

FIG. 2 shows a simple form of a valve wherein the lower part of the body of valve 6, is coupled, on the one hand to the well-head 4, and on the other to the outlet-pipe 8. In the valve body there is a seating 22 which can be contacted by a valve member 24, held in the closed position by a spring 26. The valve member 24 is connected by a stem 28 to a piston 30 of the hydraulic jack 18 and cylinder 32 in which the piston 30 slides is situated in the upper part of the valve. A joint 34 insures the water-tightness of the piston 30 in the cylinder 32. The control-pipe 20 bringing the oil under pressure opens into the cylinder 32.

The valve member has been shown merely as an example of the other type of closing-device which can be used in a valve according to the invention.

FIG. 3 is a diagrammatic illustration of the elements making up the central control post 21. This post comprises a source of pressurized hydraulic fluid composed of an oleo-pneumatic accumulator 34, such as a piston-accumulator whose piston 36 separates the cylinder of the accumulator into a gas-compartment 38, in which a cushion of gas under pressure is set up, and an oil-compartment 40, which is connected by means of a non-return valve 42 and a pipe 44, to a pump 46 which draws the oil into a tank or reservoir 48.

The oil-compartment 40 is connected in parallel by a pipe 50 to all the control-pipes 20 each of which feeds the jack 18 of the valve 6.

Between the pipe 50 and the outlet of each of the pipes 20 is inserted a means of hydraulic switching shown in FIG. 3 as a three-channel tap 52, which is in one position (that shown for the first and third pipes 20), connects pipe 20, and consequently the corresponding jack 18, with the accumulator 34 while, in the other position (that shown for the second pipe 20), it connects the pipe 20 with a draining-nozzle 54, which returns the oil to the tank 48.

On each pipe 20, up-flow from the tap 52, a pressure-indicator 56 is attached, which indicates at any given moment the position, open or closed, of the corresponding valve.

The plant's functioning is extremely simple. When the accumulator 34 is loaded, it is enough, to open any one of the valves 6 to bring the corresponding tap 52 into the feed position. The pressurized oil pushes the piston 30 of the jack 18 of the corresponding valve 6 against the spring 26 which opens the valve member 24, with the valve remaining open as long as communication with the accumulator 34 remains established and the various pressure indicators permanently showing the positions of all the valves.

In order to close a valve again, the corresponding tap 52 is put to the draining position, and the spring 26 brings the valve member 24 back on to its seating, and drives the oil contained in the jack through the pipe 20 and the drain-pipe 54.

It can be seen that perfect security is assured, since any damage, serious leak, lack of pressure or the like is rendered harmless by the automatic closing of the corresponding valve or valves.

As an additional safety measure a supplementary tap 58 which is normally closed can be attached at any accessible point on each pipe 20 to insure draining of the corresponding pipe.

However, for certain uses, the simplified valve shown in FIG. 2 can have certain disadvantages, especially because its closing is relatively slow, as the oil drained from the jack must travel through the whole length of pipe 20. This pipe can be of great length, and is preferably narrow in section, to withstand the pressure. On the other hand, certain of the control-elements, notably the return-spring 26, are in contact with the petroleum, which may contain corrosive matter. Thus, the drainage of air which might eventually penetrate into the oil is not assured.

Figure 4:
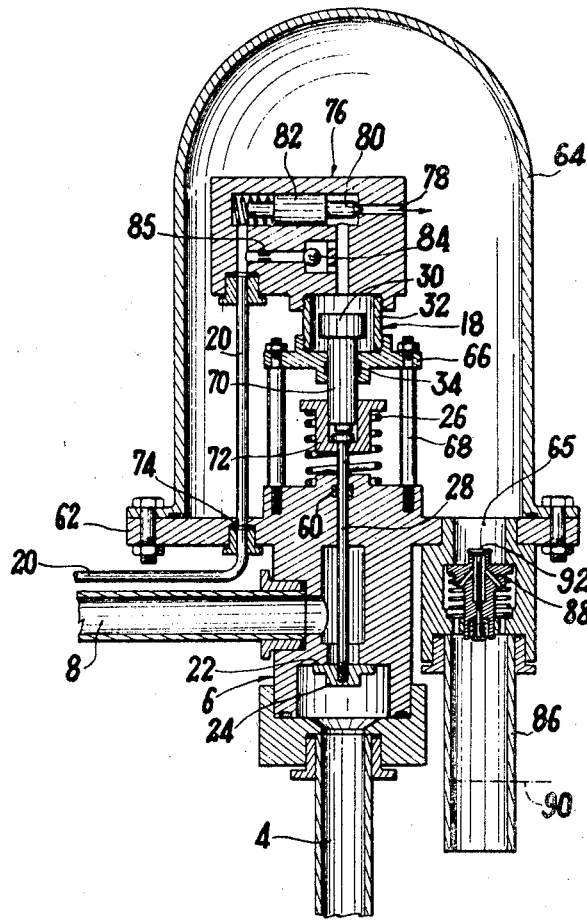
FIG. 4 is a sectional view of a preferred embodiment of an hydraulically-controlled valve, according to the invention.

FIG. 4 shows a preferred embodiment of the invention which does not have these disadvantages.

The body of valve 6 is coupled, as in the preceding embodiment to petroleum-pipes 4 and 8 but the control-stem 28 of the valve member 24 extends from the valve-body through a watertight joint 60. Thus in this embodiment the petroleum is not in contact with any moving part of the valve 6.

Above the valve-body there is mounted, for example, on a flange 62 forming part of the valve-body, a bell 64 which is full of oil and in which the moving parts of the valve 6 are situated. A low point 65 of the bell is in communication with the outside, i.e., the sea, for a reason to be hereinafter explained.

The moving parts comprise the hydraulic jack 18, in which the piston 30, for example one of the plunger piston variety can move.

The cylinder 32 can be subject to the valve-body by means of its base 66 and distance-pieces 68, with stem 70 of the piston 30 going through the base 68, via the watertight packing 34.

The stem 70 exerts a pushing action against the stem 28 of the valve member 24 which facilitates alignment, as this latter stem 28 is held upwardly by the closing-spring 26 of the valve 6 and which spring 26 is inserted between the upper part of the valve-body and an upturned cap 72.

The control-pipe 20, bringing the pressurized oil from the accumulator 34 enters the bell 64 at a watertight joint 74 but is not directly connected, as is the first embodiment (see FIG. 2), to the cylinder 32 of the jack 18. A rapid-draining automatic valve 76 is inserted on the pipe 20 and is arranged in the immediate vicinity of jack 18, preferably directly mounted on the cylinder of the jack, of which it constitutes one of the bases. In the embodiment shown in FIG. 4 the automatic drain-valve 76 comprises a drain outlet 78 opening into the bell 64 and communicating with cylinder 32, with the outlet 78 being normally closed by a valve head 80 which is an integral part of a piston 82 whose face, opposed to the valve head 80, is in communication with the pipe 20. This latter pipe 20 communicates on the other hand, by means of a non-return valve or check valve 84, and finally a jet 85, with the cylinder 32 of the jack 18.

When the corresponding control-tap 52 is put into the feed position (FIG. 3), pressurized oil from the accumulator 34 acts on the piston 82 to retain the valve head 80 closed, and at the same time reaching, through the non-return valve 84 which opens, the cylinder 32, where it pushes back the piston 30. The valve 6 opens against the spring 26 and stays open as long as the pressure is maintained in the pipe 20, and the jack 18 remains connected to the source of pressurized oil. The opening of the valve can be relatively slow, if the pipe 20 is narrow in section, but in general this presents no disadvantage. On the contrary, when the tap 52 is put to the drain position, the oil contained in pipe 20 is decompressed and the pressure exerted on the face of the piston 82 turned to the side of the valve head 80, becomes the higher one. The valve head 80 therefore opens and the oil contained in cylinder 32 is rapidly driven back, under the influence of the closing-spring 26, through the drain-outlet 78, which can be wide in section.

In this way, rapid drainage and in consequence rapid closing of the valve is obtained, a fact which increases the security of its function, as one is not only certain of being able to close the valve under any circumstances in view of the spring 26 which is always available but also of being able to close the valve quickly. The embodiment just described also has the advantage that all but the control units are protected from contact with sea water or oil as they are bathed in the oil contained in the bell 64.

This arrangement has yet another advantage in view of the choice of different diameters for the stem 70 and the stem 28. When the jack 18 opens the valve 6 the volume withdrawn from the free interior volume of the bell by the exit of stem 70 is greater than the volume added by the entry of stem 28. Therefore, a certain volume of oil is expelled into the sea through outlet 65 or preferably through a chimney or discharge pipe 86 attached to the outlet. When, on the contrary, pipe 20 is set to drain and the valve closes again, the variation in volume is reversed but the volume of oil contained in the cylinder 32 of the jack which corresponds to the displacement of the piston 30 is expelled into the bell by the drain outlet 78. Therefore there is again a certain excess volume of oil in the bell and this also is evacuated by the chimney 86.

Thus, the filling of the bell with oil is always assured, even if the latter remains uninspected for several years and the expulsion of oil through outlet 78 allows the evacuation of air from pipe 20 and from the jack 18 which assures the safety and rapidity of the movements as there is no air to compress. The consumption of oil is reduced at each movement; of course, this oil is supplied and renewed by the reservoir 48 at the central control post.

As oil does not mix with sea water there is no disadvantage is leaving the lower point of the bell open to the sea through chimney 86, but one can provide, especially in order to hold the initial filling carried out on the surface, a calibrated non-return valve 88 which allows the excess oil to escape from the bell. As soon as the valve is put in place beneath the water, a few movements are enough to effect the setting of the oil-seawater line in the chimney 86, for example at level 90, so that the non-return valve 88 is not in contact with the sea water.

It is preferable to provide also a second calibrated non-return valve 92, which can with advantage be set on the valve 88 per se, but which itself allows the flow only in the inward direction, i.e., from the sea into the bell.

Because of the double non-return valve, exchanges in one direction or another can only be made if the differences in pressure go beyond a certain value. Thus useless flows are avoided, such as would risk causing a mixture of oil and sea water resulting from small variations in pressure brought about by tides, waves, etc.

At the control post, the three-way taps 52 have only been used as an illustration and any other means of hydraulic switching may be used, for example known electro-valves operated by push-button, which are automatically maintained.

I claim:
1. An underwater well-head control system comprising, in combination, a storage tank, a control station located above the water, said station including a source of liquid under pressure and a reservoir, a pipeline leading from the well-head to the storage tank, and an immersed hydraulically operated control valve device including a valve body interposed in the pipeline, a valve member movable in the valve body for controlling the flow of fluid through the pipeline, said valve member having a stem extending outwardly of the valve body, a hydraulic operator body supported by the valve body and constituting a pressure chamber, a control pipe connecting the pressure chamber to said control station, a selector valve at said control station for linking said control pipe with said source or reservoir, a spring-loaded piston in said pressure chamber and having a stem projecting outwardly of the operator body, the outer end of said piston-stem being operably connected to the outer end of said valve member stem and said piston being responsive to liquid pressure conducted through the control pipe to the pressure chamber to move the valve member through the piston stem and valve member stem against the action of the spring to closed position, and an oil filled casing mounted on the valve body for tightly enclosing the operator body, the piston stem and the valve member stem, the diameter of the piston stem being larger than the diameter of the valve member stem, a downwardly extending discharge pipe connected to the bottom of the casing, and a drain valve enclosed in the casing adapted to open a communication between the pressure chamber and the interior of the casing only during the inward stroke of the piston stem.

2. The underwater well-head control system as claimed in claim 1 including check valve means for said drain valve.

3. The underwater well-head control system as claimed in claim 1 including non-return valve means in the discharge pipe.

References Cited
UNITED STATES PATENTS

| | | | |
|---|---|---|---|
| 2,605,716 | 8/1952 | Huber | 137—209 XR |
| 2,731,168 | 1/1956 | Watts | 137—236 XR |
| 3,019,948 | 2/1962 | Huska | 137—236 XR |
| 3,212,516 | 10/1965 | Natho | 137—116.5 |
| 3,324,875 | 6/1967 | Anderson | 137—236 |

HAROLD W. WEAKLEY, Primary Examiner

U.S. Cl. X.R.

137—209; 251—25, 57